Jan. 14, 1930.  W. LOUDEN ET AL  1,743,719
ANIMAL WATER BOWL
Filed April 23, 1927  3 Sheets-Sheet 1
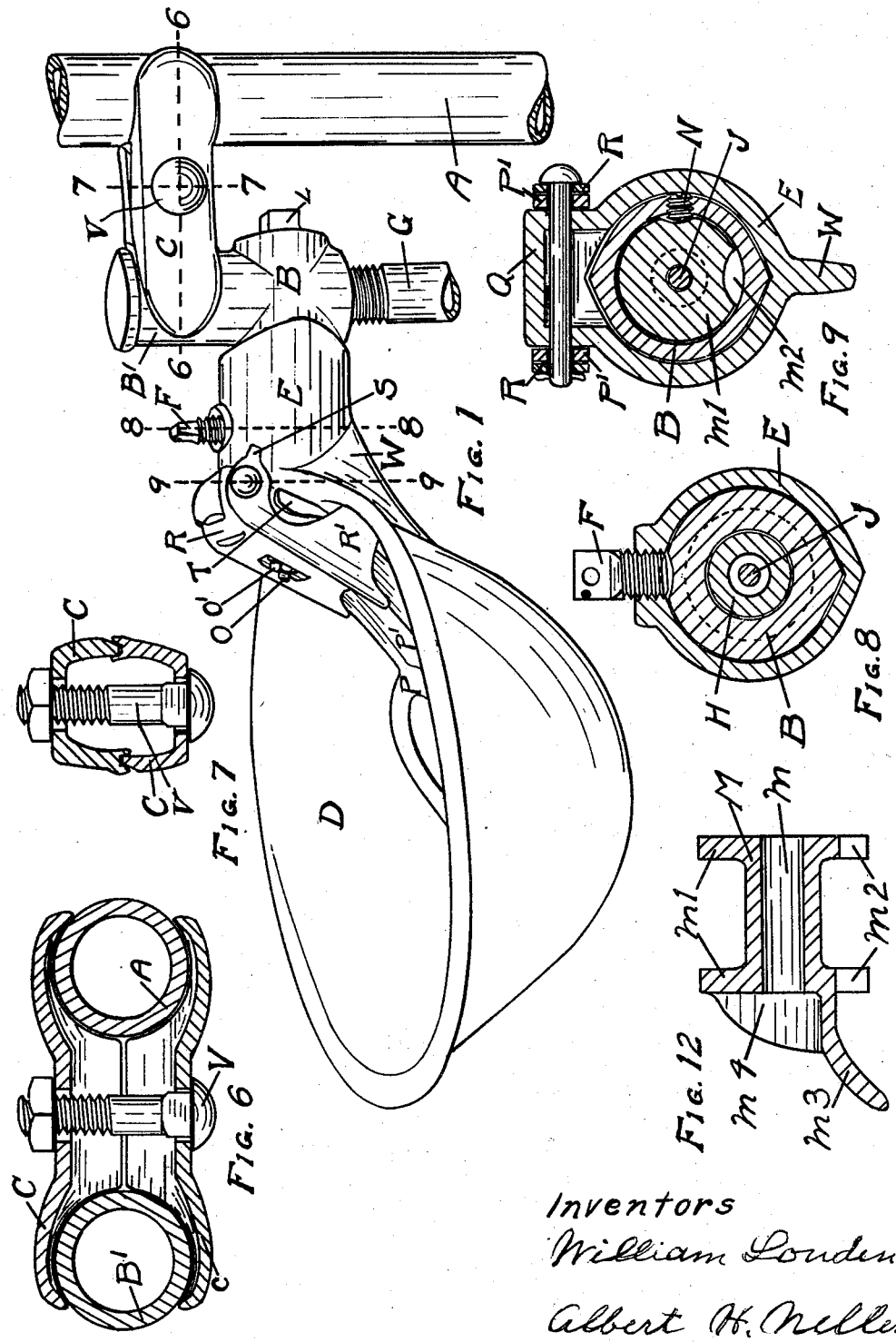
Inventors
William Louden
Albert H. Neller

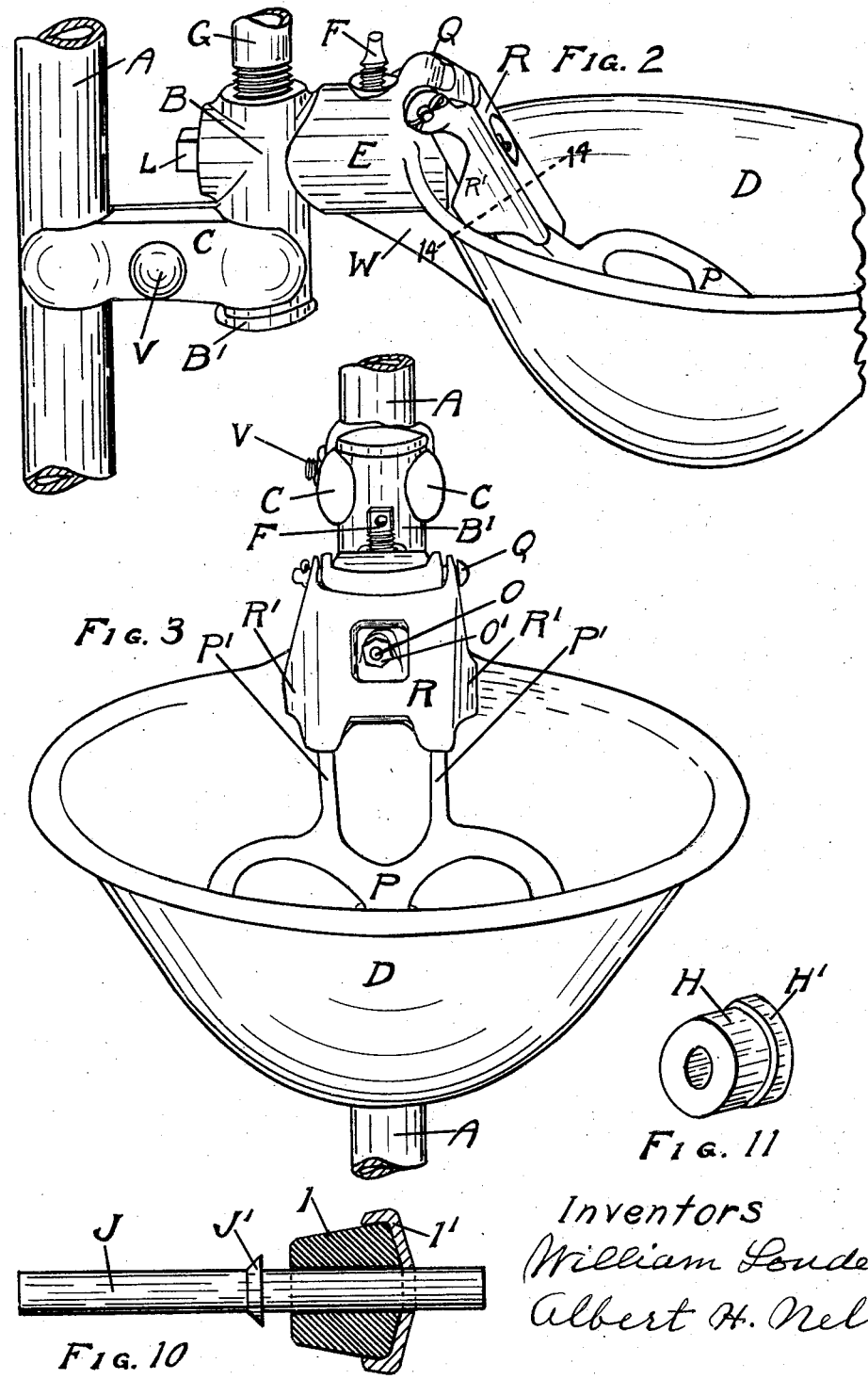

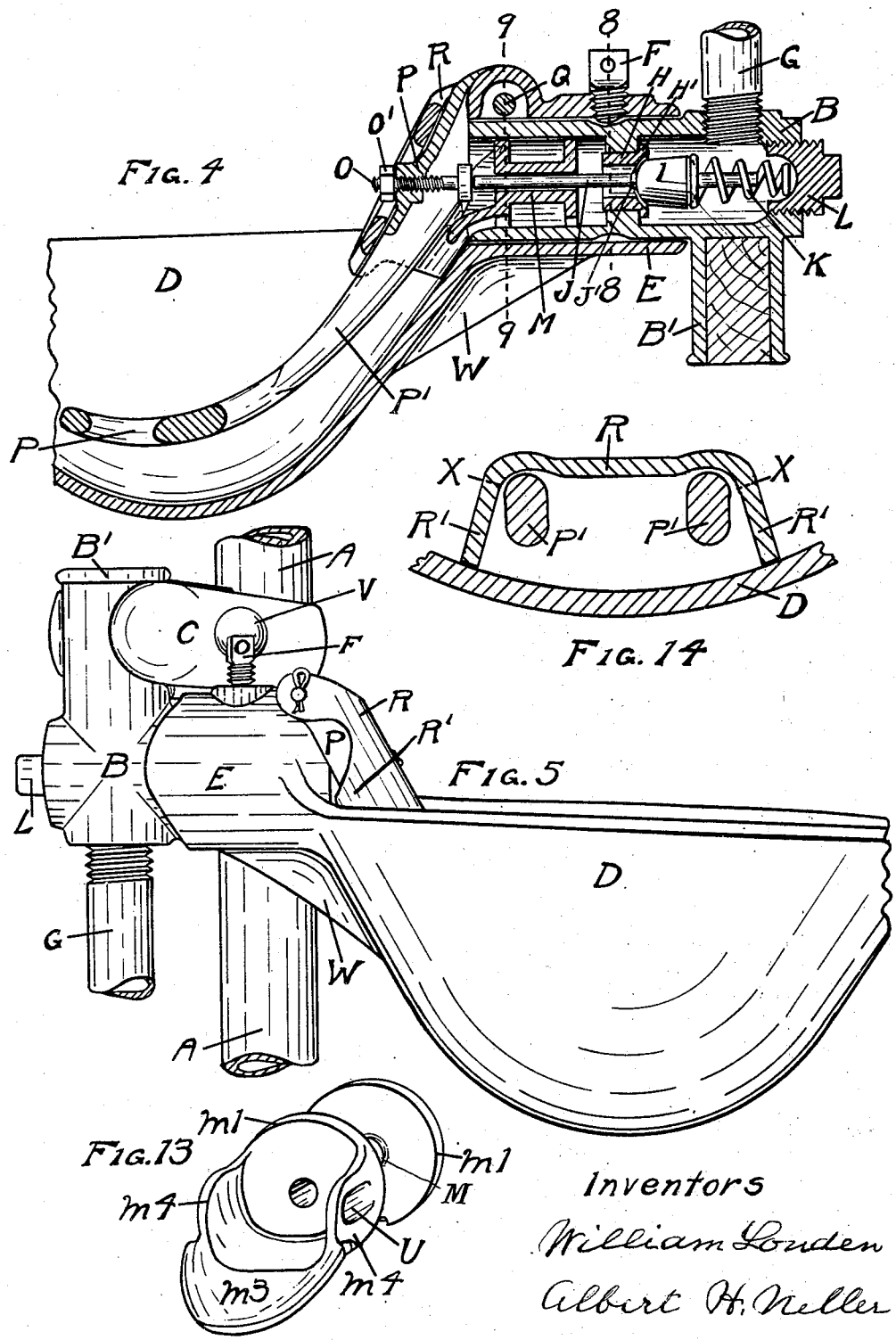

Patented Jan. 14, 1930

1,743,719

UNITED STATES PATENT OFFICE

WILLIAM LOUDEN AND ALBERT H. NELLER, OF FAIRFIELD, IOWA, ASSIGNORS TO THE LOUDEN MACHINERY COMPANY, OF FAIRFIELD, IOWA, A CORPORATION OF IOWA

ANIMAL WATER BOWL

Application filed April 23, 1927. Serial No. 186,043.

Our invention relates to water bowls to be used in animal pens or stalls, and to be operated by the animals confined therein; and it consists of an improvement in the construction of the bowl and its connections, whereby it may be more accurately adjusted in operative position, and be more easily and safely operated by the animals. Also, of other improved features which will be hereinafter set forth, and which will be definitely defined in the claims.

In the accompanying drawings forming a part of this specification, Fig. 1 is a perspective of a water bowl and its connections embodying our invention, and which is shown attached to a post of an animal stall or pen. Fig. 2 is the same, showing some of the parts in a different position, and a portion of the front edge of the bowl broken away. Fig. 3 is a front perspective of the bowl as it appears to the animal when approaching for a drink. Fig. 4 is a vertically disposed longitudinal section of the bowl and its operative parts, the post and its connection being omitted, and a part of the front edge of the bowl being broken away. Fig. 5 is a perspective showing a close or folded connection of the bowl with the post, a small portion of the front edge of the bowl being broken away. Fig. 6 is a horizontally disposed longitudinal section on line 6—6 of Fig. 1. Figs. 7, 8 and 9 are vertically disposed transverse sections respectively on lines 7—7, 8—8 and 9—9 of Fig. 1, the lines 8—8 and 9—9 being also shown in Fig. 4. Figs. 10, 11, 12 and 13 are detail views which will be hereafter explained. Fig. 14 is an inclined transverse section on line 14—14 of Fig. 2.

Referring to the drawing, A represents a post of an animal stall or pen, and B is the casting containing the valve of our water bowl which casting is connected to the post A by a clamp member C. The main part of the casting B, which may be called the valve casting, is made tubular and is horizontally disposed, but it has a vertically disposed portion B′ to which the clamp member C is connected, the advantage of which will be later explained. The water bowl D is preferably circular in form with the upper edge much wider than the bottom, whereby its sides will stand at an angle of approximately 40 degrees, which will correspond closely with the slant of the animal's lower jaw, when drinking in the bowl. On the upper back edge of the bowl, there is a horizontally disposed tubular socket E, which is adapted to be slipped on the adjacent end of the horizontally disposed portion of the valve casting B and be fastened thereon by a set screw F.

The bodies of the valve casting B and the socket E are each preferably made cylindrical so the latter will fit on the former, but in order to prevent the socket from turning on the valve casting and thereby permitting the bowl to be tipped to one side, their upper and lower contacting sides are made sharply angular, as shown by Figs. 8 and 9, which will prevent the socket E from turning on the valve casting B, thereby insuring the bowl to be always held in a level operative position.

The water for the bowl is conducted into the valve casting through a water pipe G, which in Fig. 1 is shown coming in from below, but if it is preferable to have the water pipe come in from above, all that will be necessary is to disconnect the bowl from the valve casting and then disconnect the clamp connection C from the part B′, turn the casting over, up side down connect the part B′ to the post A by the clamp C, and then re-connect the bowl to the valve casting. When thus arranged, the vertical portion B′ of the valve casting will be below and the water pipe G will be above, as shown in Fig. 2.

A valve seat H is inserted in a central part of the valve casting and an elastic valve member I, preferably of vulcanized rubber, mounted on a central portion of a valve stem J, is adapted to come in contact with the valve seat and to close the opening therein as shown in Fig. 4. To accomplish this the stem J is extended backwardly from the valve, and is encircled by a spring K, the rear end of which rests in a recess in a threaded plug L, which is screwed into the rear end of the valve casting, as also shown in Fig. 4. The valve should fit the stem tightly and there should be a small circular rib J′ on the stem against which the inner end of the valve will rest, and it is preferable to have a metal cap I' on the other end of the valve member against which the inner end of the spring K will press.

The construction of the stem and the valve and its cap I' is most plainly shown by Fig. 10 which is an enlarged side view of the stem, a longitudinal section of the valve and a transverse section of the cap, the valve being left a little distance from the rib J' on the stem in order to show it more plainly. The valve seat H is preferably driven tightly into a reduced opening in a central portion of the valve casting B as shown in Fig. 4 and is provided with a flange H' on its rear end to prevent it from being pushed through said opening. Fig. 11 is an enlarged perspective of the valve seat.

After being passed through the valve seat H, the front end of the valve stem J is passed through a member M which may be called a combined valve stem guide and water baffle, for besides holding the valve stem centrally in the valve casting B, and permitting it to be moved horizontally endwise to open and close the valve, it also acts as a water baffle or check to reduce the pressure of the incoming water and to direct it downwardly into the bowl, thus preventing it from being forced out over the upper edges of the bowl. As shown by Fig. 9, and also by Figs. 12 and 13, the former of the two latter being a detached vertically disposed longitudinal section, and the latter an end perspective of the member M. It is provided with a longitudinally disposed central opening $m$ through which the front end of the valve stem J is passed, as shown in Fig. 4.

On each end of the member M are cylindrical flanges $m^1$ large enough to completely fill the cylindrical opening in the valve casting B. On the under sides of the flanges $m^1$ there are cut away portions $m^2$ through which the water which passes through the valve I when open, will be delivered into the bowl. On the outer end of the member just above the opening in that end, an outwardly and downwardly projecting portion $m^3$ is formed so as to conduct the water passing through the openings $m^2$ downwardly into the bowl. The portion $m^3$ is preferably made concave on its lower side, whereby the water will be conducted more centrally into the bowl and will be prevented from being deflected to the sides where it might be sprayed over the adjacent edges of the bowl.

On each side of the member M there are also outwardly projecting flanges $m^4$ coinciding with the cylindrical outlines of the sides of the flanges $m^1$, and so far as they enter, to fit the cylindrical opening in the valve casting B. The construction of the member M is such that it really forms a double water baffle, the water first passing through the opening $m^2$ in the lower edge of the inner flange $m^1$ and then through the opening in the outer flange $m^1$ and under the outstanding portion $m^4$.

The portion of the side flanges $m^3$ abutting the inner end of the screw N are preferably hollowed out a little as shown by U in Fig. 13, to receive the end of the screw N, see Fig. 9, and to thereby hold the member M more securely in position in the outer end of the valve casting B. When the valve casting B is turned over to bring the water pipe in from above instead of below, as heretofore explained, and vice versa, the screw N has to be loosened and the member M turned around so the openings $m^2$ and the part $m^3$, which may be called a water guide will always be on the lower side of the opening in the valve casting B, whereby the water will always be conducted downwardly into the bowl.

The end of the valve stem J extending out through the member M is adapted to come in a central contact with the head of a bolt O which is passed through an adjacent horizontally disposed threaded hole in an upper portion of the member P which is located in the bowl and its upper end is pivoted at Q to an upstanding portion of the socket E. This member P is generally called the nose piece because the animal in drinking presses it down with its nose to open the valve I. The spring K holds the valve I closed and also presses the outstanding end of the valve stem J against the head of the bolt O, which in turn pushes the nose piece P out so its lower end will stand some distance away from the bottom of the bowl, as shown in Fig. 4.

Usually the outstanding end of the valve stem J is brought into direct contact with the adjacent portion of the nose piece P, but in our invention we use the bolt O which may be easily and quickly adjusted to secure any desired opening of the valve I and to hold the lower end of the nose piece at any desired distance from the bottom of the bowl. All that is necessary to effect this desired ajustment is to loosen the lock nut O1, then turn the nose piece up a little on its pivot Q so the head of the bolt O will be accessible, and then turn the bolt in the desired direction either outward or inward in the threaded hole in which it is inserted, to effect the desired adjustment. When properly adjusted turn nose piece down to its normal position and then tighten the lock nut O1 all of which may be easily and quickly done, and the adjustment is completed.

Usually the nose piece P is pivoted down near the bottom of the bowl which is an improper position because the animal's nose in drinking will press on the nose piece at an angle of approximately 45 degrees instead of approximately vertically, and the movement of the nose piece should be in approximately the same direction. In a few cases the nose piece, as shown in our drawings, has been pivoted above the upper edge of the bowl to secure this result, and when this has been done, it has been found that in some cases, an animal having horns will press its horns against the arms P1 of the nose piece between the pivot and the upper edge of the bowl, and will continue to press the nose piece into the position to hold the valve open, and thus flood the bowl with water.

To overcome this trouble, we have provided a guard R for the nose piece which will effectually prevent an animal from pressing the nose piece down and holding the valve in open position with its horns. This guard is made of a thin piece of metal either cast or pressed into shape, substantially as shown in Fig. 14 which is a transverse section on line 14—14 of Fig. 2, including the guard, the arms P1 of the nose piece, and an adjacent section of the bowl D. The guard is pivoted at Q on the outsides of the pivoted ends of the nose piece, and is arranged to stand outside of the arms P1 of the nose piece when it is pressed out by the spring K which closes the valve I, and then to rest against the side of the bowl D, whereby the arms of the nose piece above the edge of the bowl cannot be reached by the horns of the animal, which may press against the guard R but cannot affect the nose piece.

The preferable form of this guard is shown by Fig. 14 in which a portion R1 is extended back on each side of the arms P1 so as to rest against the adjacent side of the bowl D and thus protect the arms of the nose piece from the pressure of the animal's horns. If desired, the side parts R1 may be placed inside of the arms P1, instead of outside, as shown in Fig. 14, or a single central part of the guard R may be used to rest against the side of the bowl in which cases the side parts R1 may be cut off at X—X. The guard having the same pivot as the nose piece will be lifted up with it when the nose piece is turned up, but to prevent it from being lifted and held up independently and thus leaving the arms P1 of the nose piece unprotected, a lug S is formed on the upper end of one of its sides as shown in Fig. 1 which is adapted to come into contact with a shoulder T on an adjacent part of the arm of the nose piece.

By this, or similar means the guard cannot be lifted to expose the arms of the nose piece so that it may be pressed upon by the horns of an animal and thus hold the valve open and permit the flooding of the bowl. In this and in other respects, heretofore set forth, our bowl is a decided improvement in the art. The vertical part B′ of the valve casting is preferably made cylindrical to correspond with the contour of the post A so either end of the clamp C may be applied to the post or the part B′. It may be made hollow to save metal and may be filled with any inexpensive filler. The clamp C is composed of two mating pieces held together by the bolt V as most plainly shown by Figs. 6 and 7. A web W is preferably used to strengthen the connection between the bowl D and its socket E. The vertically disposed stall post A, or its equivalent which forms the supporting member, and also the vertically disposed portion B′ of the casting B, being both cylindrical in horizontal section, and the ends of the connecting clamp C being formed to fit them, it is plain that the clamp may be adjusted laterally to a large extent on both the supporting member A and the vertically disposed portion B′. By this means the bowl and the casting B to which it is connected may be adjusted closer to or farther from the supporting member, and on either side thereof. Also, that the bowl and the casting C may be maintained in almost any desired outstanding position regardless of its adjustment with the supporting member, as will be readily seen by a comparison of Figs. 1, 2 and 3 with Fig. 5.

The bowl is made in the most approved form, it is held more securely in place by means of the set screw F than if the usual latching means were used, and it can be easily and quickly attached to or removed from the valve casting B by using a small wrench or a nail, or a piece of wire to insert in the hole in the head of the set screw when a wrench is not at hand. The shape of the bowl, the location of the nose piece, its protection by the guard R and the ready adjustment of the valve mechanism are all valuable features. The bowl and its operative mechanism is simple in construction and is durable and effective in operation.

What we claim as new and desire to secure by Letters Patent is—

1. In animal water bowls, a horizontally disposed tubular valve casting provided with an operable water valve therein, and being adapted to be connected to a portion of an animal stall or pen, a water bowl having on one side of its upper edge, a horizontally disposed tubular socket adapted to be slipped over the outstanding end of the valve casting, and to be fastened thereon, and means in the bowl to operate the valve in the casting to admit water into the bowl.

2. In animal water bowls, a horizontally disposed tubular valve casting provided with an operable water valve therein, and being adapted to be connected to a portion of an animal stall or pen, a water bowl having on one side of its upper edge, a horizontally disposed tubular socket adapted to be slipped over the outstanding end of the valve casting, a threaded set screw in the socket adapted to come in contact with the valve casting and to fasten the socket with bowl thereon, and means in the bowl to operate the water valve.

3. In a device of the character described, a horizontally disposed tubular valve casting having a valve therein and a vertically disposed cylindrical portion on its rear end, said portion being adapted to be adjustably connected to a vertically disposed portion of an animal stall or pen, a water bowl having on one side of its upper edge an outstanding horizontally disposed tubular socket adapted to be slipped over the outstanding end of the valve casting, and to be fastened thereon, and means in the bowl to operate the valve in the casting.

4. In a device of the character described, a horizontally disposed tubular valve casting, a bowl with a tubular shaped socket on its upper edge adapted to be slipped over the valve casting and be fastened thereon, the upper and lower contacting portions of the socket and valve casting being angular to prevent the socket from tilting on the casting and to fit the casting when turned either up or down.

5. In animal water bowls, a horizontally disposed valve casting having an operable water valve therein, and being adapted to be connected to a portion of an animal stall or pen, a water bowl having on one side of its upper edge a horizontally disposed tubular socket adapted to be slipped over the outstanding end of the valve casting and to be fastened thereon, a horizontally disposed valve stem carrying a water valve in the casting, a member pivoted to an upper portion of the socket on the bowl to be operated by an animal to open the valve to admit water into the bowl, said valve operating member being provided with adjustable means to come in contact with the valve stem, whereby the opening and closing of the valve may be adjusted to suit requirements.

6. In a device of the character described, a horizontally disposed tubular valve casting having a valve centrally mounted on a valve stem and adapted to be opened and closed, a water bowl mounted on the front end of the valve casting and having valve opening mechanism, a member forming a combined valve stem guide and water baffle, located in the front end of the valve casting and having a central opening through which the front end of the valve stem is extended, said member having spaced apart circular flanges adapted to fill closely the cylindrical opening in the valve casting, also an opening in each of the lower edges of said flanges to admit water into the bowl when the valve is opened by the valve opening mechanism, and means to hold the valve closed when the valve opening mechanism is not in operation.

7. In a device of the character described, a horizontally disposed tubular valve casting having a valve centrally mounted on a valve stem and adapted to be opened and closed, a water bowl mounted on the front end of the valve casting and having valve opening mechanism, a member forming a combined valve stem guide and water baffle, located in the front end of the valve casting and having a central opening through which the front end of the valve stem is extended, said member having an opening on its lower side to admit water into the bowl when the valve is open, and an outstanding portion above the water passage on the end of the member and above the adjoining edge of the bowl, said outstanding portion being downwardly extended and concave on its lower side, whereby the water will be downwardly and centrally directed into the bowl.

8. In a device of the character described, a horizontally disposed tubular valve casting adapted to be turned upside down and having a valve centrally mounted on a valve stem and adapted to be opened and closed, a water bowl mounted on the front end of the valve casting and having valve opening mechanism, a member forming a combined valve stem guide and water baffle, located in the front end of the valve casting and having a central opening through which the front end of the valve stem is extended, said member having a circular flange adapted to close the tubular opening in the front end of the valve casting, leaving a small opening in the lower edge to allow water to pass into the bowl when the valve is open, and vertically disposed side extensions curved to correspond with the cylindrical contour of the sides of said circular flanges, and a screw in one side of the end of the valve casting adapted to contact with one or the other of the adjacent side extensions, according to which side of the valve casting is up or down, whereby the member will be securely held in its position in the valve casting, and means to open and close the valve in the casting.

9. In animal water bowls, a horizontally disposed tubular casting having a valve mounted on a valve stem extending through the opening in the casting, a spring in the rear end of the casting to close the valve, a water bowl mounted on the front end of the casting, a nose piece having its upper end pivoted to an upper portion of the bowl connection and its lower end extended down into the bowl to be operated by the animal in drinking, a flat headed bolt having a threaded end inserted in a threaded hole in the nose piece and adjustable therein, so the headed end will come in contact with the extended end of the valve stem and will open the valve when the nose piece is pressed in by the animal, the nose piece being pressed outward and its lower end held upward by the spring which closes the valve, and a lock nut to hold the bolt in adjusted position, whereby the adjusting of the bolt will adjust the movements of the valve as may be required.

10. In a device of the character described, the combination of a horizontally disposed casting containing a valve mounted on a horizontally extended operating stem, a water bowl rigidly connected to the outer end of said casting and having a nose piece pivoted to a portion of the structure a distance above the upper edge of the bowl, said nose piece being in contact with the extended end of the valve stem, and adapted to press it back and open the valve when the animal in drinking presses the nose piece in, and a guard member placed over the portion of the nose piece between its pivot and the upper edge of the bowl and pivoted to an upper part of the nose piece, said guard resting against the adjacent side of the bowl, whereby the movement of the nose piece by the horns of an animal will be prevented, substantially as set forth.

11. In a device of the character described, the combination of a casting containing a valve mounted on an extended operating stem, a water bowl connected to said casting and having a nose piece pivoted to a portion of the structure above the upper edge of the bowl, said nose piece being in contact with the extended end of the valve stem, and adapted to press it back and open the valve when the animal in drinking presses the nose piece in, and a guard member placed over the portion of the nose piece between its pivot and the upper edge of the bowl, said guard having backwardly extended portions resting against the adjacent side of the bowl, whereby the movement of the nose piece by the horns of an animal will be prevented, substantially as set forth.

12. In a device of the character described, the combination of a casting containing a valve mounted on an extended operating stem, a water bowl connected to said casting and having a nose piece pivoted to a portion of the structure above the upper edge of the bowl, said nose piece being in contact with the extended end of the valve stem, and adapted to press it back and open the valve when the animal in drinking presses the nose piece in, and a guard member to prevent the nose piece from being moved by the horns of an animal, said guard member being pivoted adjacent to the pivot of the nose piece, and having an extended lug adapted to come in contact with an adjacent shoulder on the nose piece, which will prevent the guard from being turned up independently of the nose piece, thus preventing the nose piece from being exposed to the horns of an animal.

13. In animal water bowls, a tubular water supply casting having a horizontally disposed portion containing a valve therein, a reduced opening in a central portion of the casting, a valve seat having a flange on its rear end inserted in said reduced opening, a valve stem passed centrally through the casting, the front end of the stem extending out of the front end of the casting and its rear end coming within a short distance of the rear end of the casting, a valve mounted on a central portion of the valve stem in the rear of the valve seat, a plug in the rear end of the casting, a coiled spring encircling the rear end of the valve stem with one end resting against the plug and the other end against the valves to hold it closed, and a valve opening member having its upper end pivoted to a portion of the bowl above the water supply casting, a central portion of said last mentioned member when pressed in contact with the adjacent extended end of the valve stem will open the valve, whereby water may be admitted into the bowl.

WILLIAM LOUDEN.
ALBERT H. NELLER.